(12) United States Patent
Dsouza (10) Patent No.: US 12,491,625 B1
(45) Date of Patent: Dec. 9, 2025

(54) FRICTION BRAKE FOR ARTICULATING ARM LINKAGE

(71) Applicant: Applied Materials, Inc., Santa Clara, CA (US)

(72) Inventor: Alison Dsouza, Karnataka (IN)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 18/735,129

(22) Filed: Jun. 5, 2024

(51) Int. Cl.
*B25J 9/10* (2006.01)

(52) U.S. Cl.
CPC .................. *B25J 9/106* (2013.01)

(58) Field of Classification Search
CPC ........ B25J 9/106; B25J 9/042; B25J 19/0004
See application file for complete search history.

(56) References Cited

U.S. PATENT DOCUMENTS 2,862,582 A  12/1958 Rose et al.
4,552,502 A * 11/1985 Harjar .................... B25J 17/025
                                                        414/730

FOREIGN PATENT DOCUMENTS

| CN | 105922250 | A |   | 9/2016  |           |
|----|-----------|---|---|---------|-----------|
| CN | 110682326 | A | * | 1/2020  | B25J 17/02 |
| CN | 111843984 | A | * | 10/2020 | B25J 18/00 |
| CN | 114131655 | A |   | 3/2022  |           |
| CN | 118088596 | A |   | 5/2024  |           |
| WO | 2012008321 | A1 |  | 1/2012  |           |

OTHER PUBLICATIONS

Application No. PCT/US2025/031455, International Search Report and Written Opinion, Mailed On Sep. 24, 2025, 9 pages.

* cited by examiner

*Primary Examiner* — Bobby Rushing, Jr.
(74) *Attorney, Agent, or Firm* — Kilpatrick Townsend & Stockton LLP (57) ABSTRACT

Exemplary articulating arms include a first articulating arm segment, a second articulating arm segment, and an articulating linkage movably connecting the first articulating arm segment and the second articulating arm segment. An articulating linkage includes a shaft having a first end and a second end, the shaft extending through the first articulating arm segment and the second articulating arm segment, and a friction brake comprising a tension block and a tension screw. Articulating arms include where the second end of the shaft is disposed in an aperture extending through the tension block, and the tension screw extends through the tension block in a direction generally perpendicular to the aperture.

20 Claims, 7 Drawing Sheets

FRICTION BRAKE FOR ARTICULATING ARM LINKAGE

TECHNICAL FIELD

The present technology relates to components and apparatuses for semiconductor manufacturing. More specifically, the present technology relates to articulating arms useful for the assembly of processing chamber components and semiconductor processing equipment.

BACKGROUND

Integrated circuits are made possible by processes which produce intricately patterned material layers on substrate surfaces. Producing patterned material on a substrate requires controlled methods for forming and removing material. Chamber components often deliver processing gases to a substrate for depositing films or removing materials. To promote symmetry and uniformity, chamber components have been introduced that may include regular patterns of features, such as apertures, for providing materials in a way that may increase uniformity. In order to clean deposits formed within the apertures and over the component body, such chamber components require regular removal from the chamber, which may also require removal of all or a portion of the lid stack of the chamber. However, removal of chamber components has become increasingly difficult due to the complexity and size of the chambers as well as the increasing weight and complexity of the components.

Thus, there is a need for improved platforms and methods that can be used to assemble and disassemble semiconductor processing chambers as well as facilitate the removal and reassembly of chamber components therefrom. These and other needs are addressed by the present technology.

SUMMARY

The present technology is generally directed to articulating arms, systems including such arms, methods of utilizing articulating arms. Articulating arms include a first articulating arm segment, a second articulating arm segment, and an articulating linkage movably connecting the first articulating arm segment and the second articulating arm segment. Articulating linkages include a shaft having a first end and a second end, the shaft extending through the first articulating arm segment and the second articulating arm segment, and a friction brake that includes a tension block and a tension screw. Articulating arms include where the second end of the shaft is disposed in an aperture extending through the tension block, and the tension screw extends through the tension block in a direction generally perpendicular to the aperture.

In embodiments, articulating arms further include a braking support disposed between an inner wall of the aperture and an exterior surface of the second end of the shaft. In more embodiments, the second end of the shaft includes a flange and a projection, wherein the flange and the projection are disposed within the aperture of the tension block. Furthermore, in embodiments, the tension block further includes a tension gap extending through a width of the tension block through a first sidewall toward an opposed second sidewall. Additionally or alternatively, in embodiments, the tension gap bisects the aperture. Embodiments include where the tension gap extends in a direction generally perpendicular to the tension screw. In yet more embodiments, the tension screw is disposed adjacent to the first side.

In embodiments, the tension gap extends through the first sidewall to a point between the aperture and the second sidewall. Moreover, in embodiments, the first articulating arm segment includes a first end having a base, and a second end, and the second articulating arm segment includes a first end and a second end, where the first end of the second articulating arm segment is disposed in the second end of the first articulating arm segment. In embodiments, the second end of the first articulating arm segment includes an upper arm and a lower arm, at least partially defining a volume therebetween, where a distance between an interior edge of the upper arm and an interior edge of the lower arm is greater than a width of the first end of the second articulating arm segment. In further embodiments, the shaft extends through the upper arm, the first end, and the lower arm, and the second end of the shaft extends past an exterior surface of the lower arm.

The present technology is also generally directed to articulating arms. Articulating arms include a first articulating arm segment having a second end and a first end including a base, a second articulating arm segment having a first end and a second end, and a third articulating arm segment having a first end and a second end including a component support. Articulating arms include a first articulating linkage movably connecting the first articulating arm segment and the second articulating arm segment and a second articulating linkage movably connecting the second articulating arm segment and the third articulating arm segment. Articulating arms include where each articulating linkage has a shaft having a first end and a second end, the shaft extending through the first articulating arm segment and the second articulating arm segment, and a friction brake including a tension block and a tension screw. Articulating arms include where the second end of the shaft is disposed in an aperture extending through the tension block, and the tension screw extends through the tension block in a direction generally perpendicular to the aperture.

In embodiments, articulating arms further include a braking support disposed between an inner wall of the aperture and an exterior surface of the second end of the shaft. In more embodiments, the second end of the shaft includes a flange and a projection, where the flange and the projection are disposed within the aperture of the tension block. Moreover, in embodiments, the tension block further includes a tension gap extending through a width of the tension block through a first sidewall toward an opposed second sidewall. Embodiments include where the tension gap bisects the aperture and/or the tension gap extends in a direction generally perpendicular to the tension screw. In embodiments, the tension screw is disposed adjacent to the first side. In yet more embodiments, the tension gap extends through the first sidewall to a point between the aperture and the second sidewall.

The present technology is also generally directed to methods of assembling a semiconductor processing chamber component. Methods include placing a processing chamber component on a component support of an articulating arm. Methods include where the articulating arm has a first articulating arm segment, a second articulating arm segment, and an articulating linkage movably connecting the first articulating arm segment and the second articulating arm segment. Methods include where the articulating linkage has a shaft having a first end and a second end, the shaft extending through the first articulating arm segment and the second articulating arm segment, and a friction brake comprising a tension block and a tension screw, where the second end of the shaft is disposed in an aperture extending through the tension block, and the tension screw extends through the tension block in a direction generally perpendicular to the aperture. Methods include transitioning the articulating arm from a compressed position to an extended position or from the extended position to the compressed position, and positioning the processing chamber component. In embodiments, the processing chamber component has a weight of about 75 kilograms or more.

Such technology may provide numerous benefits over conventional systems and techniques. For example, embodiments of the present technology may allow assembly and disassembly of components in semiconductor processing chambers with little to no sway or stalling of the articulating arm. Additionally, devices and techniques discussed herein are capable of handling heavy components while exhibiting improved control and reduced sway. These and other embodiments, along with many of their advantages and features, are described in more detail in conjunction with the below description and attached figures.

BRIEF DESCRIPTION OF THE DRAWINGS

A further understanding of the nature and advantages of the disclosed technology may be realized by reference to the remaining portions of the specification and the drawings.

FIG. 4A shows a side view of an articulating arm according to embodiments of the present technology.

FIB. 4B shows a side view of an articulating linkage of an articulating arm according to embodiments of the present technology.

Several of the figures are included as schematics. It is to be understood that the figures are for illustrative purposes and are not to be considered of scale unless specifically stated to be of scale. Additionally, as schematics, the figures are provided to aid comprehension and may not include all aspects or information compared to realistic representations and may include exaggerated material for illustrative purposes.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the letter.

DETAILED DESCRIPTION

Plasma enhanced deposition processes may energize one or more constituent precursors to facilitate film formation on a substrate. Any number of material films may be produced to develop semiconductor structures, including conductive and dielectric films, as well as films to facilitate transfer and removal of materials. For example, hardmask films may be formed to facilitate patterning of a substrate, while protecting the underlying materials to be otherwise maintained. In many processing chambers, a number of precursors may be mixed in a gas panel and delivered to a processing region of a chamber where a substrate may be disposed. The precursors may be distributed through one or more components within the chamber, which may produce a radial or lateral distribution of delivery to provide increased formation or removal at the substrate surface.

For example, one or more components may be included within a processing chamber for delivering and distributing precursors within a processing chamber, as well as a lid stack for sealing a top of the chamber. A blocker plate may be included in a chamber to provide a choke in precursor flow, which may increase residence time at the blocker plate and lateral or radial distribution of precursors. In addition, faceplates have been formed that can further improve uniformity of delivery into a processing region, for example, by containing a plurality of apertures, which may improve deposition or etching. However, even small amounts of leftover precursor or film can negatively affect further process steps, requiring regular removal of faceplates for cleaning. In addition, various substrates utilizing differing film types and patterns can require faceplates with alternative delivery profiles. These factors, among others, necessitate regular removal and replacement of faceplates and other components within processing chambers. Often, it is also desired to periodically remove all or a portion of the lid stack to access the chamber interior, or clean other lid stack components.

Processing chambers have also become more complex. Consequently, the number and weight of components within or on the chamber to maneuver into or out of position has become increasingly challenging. Moreover, the size of processing chambers has increased. Increase in chamber size may require placement of the faceplate or other components, in areas distal from the exterior of the chamber. Such complex placement is compounded by the fact that chamber components have a relatively high weight, which continues to increase as components increase in complexity.

Existing assembly processes utilize articulating arms, which may be robotic articulating arms to aid in assembly and disassembly of semiconductor processing chambers and components thereof. However, existing arms utilize bushings and bearings to control braking in the hinges forming linkages between adjacent articulating arm segments. The use of bearings, unfortunately, renders existing robotic arms with unacceptable sway, to the point where the arm is unable to articulate or may even completely fail, particularly with heavy components. Similarly, bushings provide excess friction, particularly under heavy loads, rendering the articulating segment immovable. Thus, in existing designs, the brakes associated with each articulating segment fail to provide the necessary control, resulting in sway or excess friction that is capable of dislodging the component from the articulating arm, or rendering the arm immovable.

The present technology overcomes these challenges for the assembly and disassembly of semiconductor processing chambers and components thereof. The present technology has overcome these and other problems by providing a friction brake disposed in contact with a pivotable shaft of an articulating link of an articulating arm. The amount of friction applied via the friction brake can be carefully controlled based upon the load and sway of the articulating arm. Namely, the friction brake of the present technology may provide tailored control of the articulating link, allowing for movement and assembly/disassembly of chamber components, including heavy or bulky components, without losing control of the articulating arm. For instance, the design of the friction brake may transfer the hinge point of the linkage to the backside of the friction brake, increasing the force applied to the linkage, while allowing for control of the force to maintain the friction below a threshold level. The friction brake may therefore be carefully controlled to provide the stability necessary for the articulating segment.

Although the remaining disclosure will routinely identify specific processes chambers and components thereof utilizing the disclosed technology, it will be readily understood that the apparatus and methods are equally applicable to other deposition and cleaning chambers, components thereof, as well as processes as may occur in the described chambers. Accordingly, the technology should not be considered to be so limited as for use with these specific process chambers or components thereof alone. The disclosure will discuss one possible process chamber that may include one or more components arranged utilizing a loading platform according to embodiments of the present technology before additional variations and adjustments to this apparatus according to embodiments of the present technology are described.

Figure 1:
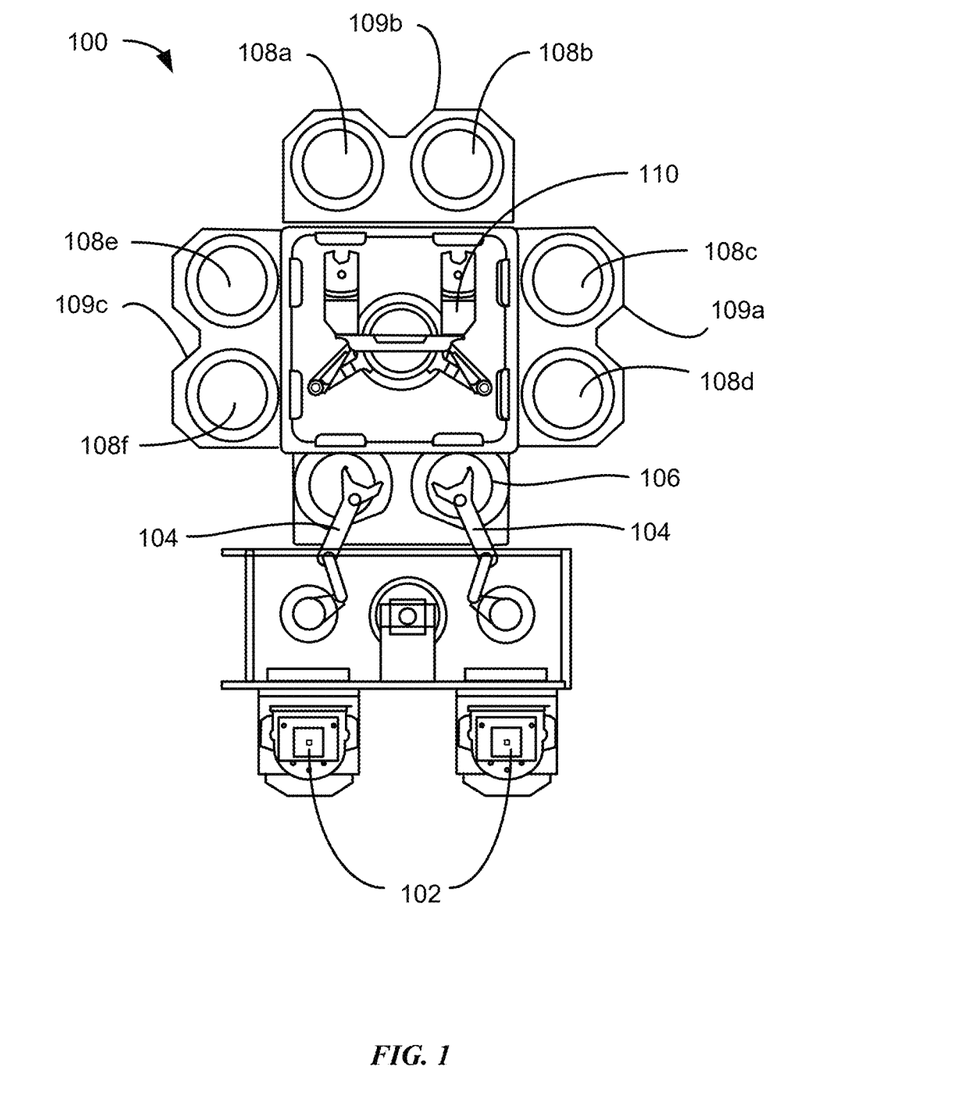
FIG. 1 shows a top plan view of an exemplary processing system according to some embodiments of the present technology.

FIG. 1 shows a top plan view of one embodiment of a processing system 100 of deposition, etching, baking, and curing chambers according to embodiments. In the figure, a pair of front opening unified pods 102 supply substrates of a variety of sizes that are received by robotic arms 104 and placed into a low-pressure holding area 106 before being placed into one of the substrate processing chambers 108a-f, positioned in tandem sections 109a-c. A second robotic arm 110 may be used to transport the substrate wafers from the holding area 106 to the substrate processing chambers 108a-f and back. Each substrate processing chamber 108a-f, can be outfitted to perform a number of substrate processing operations including formation of stacks of semiconductor materials described herein in addition to plasma-enhanced chemical vapor deposition, atomic layer deposition, physical vapor deposition, etch, pre-clean, degas, orientation, and other substrate processes including, annealing, ashing, etc.

The substrate processing chambers 108a-f may include one or more system components for depositing, annealing, curing and/or etching a dielectric or other film on the substrate. In one configuration, two pairs of the processing chambers, e.g., 108c-d and 108e-f, may be used to deposit dielectric material on the substrate, and the third pair of processing chambers, e.g., 108a-b, may be used to etch the deposited dielectric. In another configuration, all three pairs of chambers, e.g., 108a-f, may be configured to deposit stacks of alternating dielectric films on the substrate. Any one or more of the processes described may be carried out in chambers separated from the fabrication system shown in different embodiments. It will be appreciated that additional configurations of deposition, etching, annealing, and curing chambers for dielectric films are contemplated by system 100.

Figure 2:
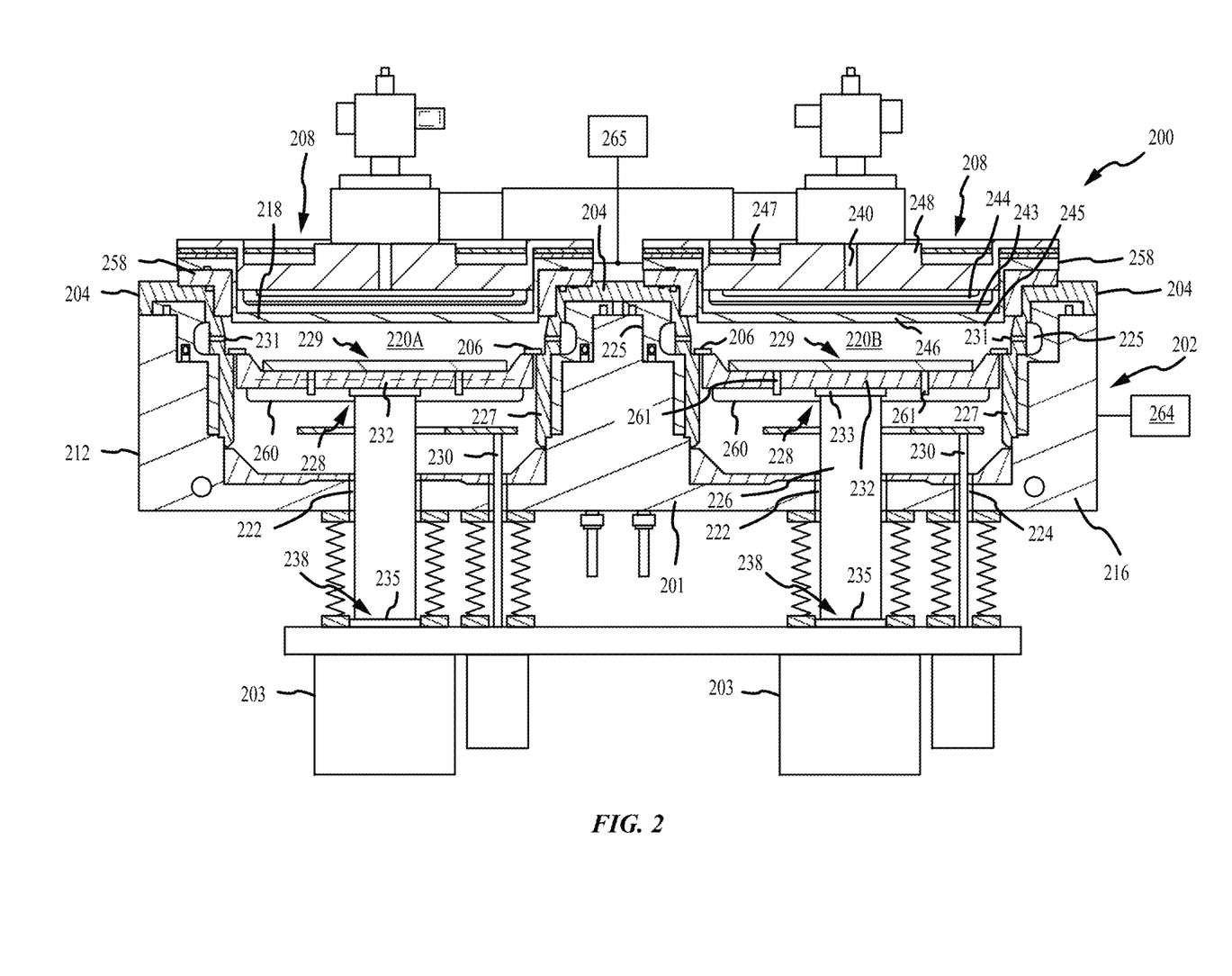
FIG. 2 shows a schematic cross-sectional view of an exemplary plasma system according to some embodiments of the present technology.

FIG. 2 shows a schematic cross-sectional view of an exemplary plasma system 200 according to some embodiments of the present technology. Plasma system 200 may illustrate a pair of processing chambers 108 that may be fitted in one or more of tandem sections 109 described above, and which may include faceplates or other components or assemblies according to embodiments of the present technology. The plasma system 200 generally may include a chamber body 202 having sidewalls 212, a bottom wall 216, and an interior sidewall 201 defining a pair of processing regions 220A and 220B. Each of the processing regions 220A-220B may be similarly configured and may include identical components.

For example, processing region 220B, the components of which may also be included in processing region 220A, may include a pedestal 228 disposed in the processing region through a passage 222 formed in the bottom wall 216 in the plasma system 200. The pedestal 228 may provide a heater adapted to support a substrate 229 on an exposed surface of the pedestal, such as a body portion. The pedestal 228 may include heating elements 232, for example resistive heating elements, which may heat and control the substrate temperature at a desired process temperature. Pedestal 228 may also be heated by a remote heating element, such as a lamp assembly, or any other heating device.

The body of pedestal 228 may be coupled by a flange 233 to a stem 226. The stem 226 may electrically couple the pedestal 228 with a power outlet or power box 203. The power box 203 may include a drive system that controls the elevation and movement of the pedestal 228 within the processing region 220B. The stem 226 may also include electrical power interfaces to provide electrical power to the pedestal 228. The power box 203 may also include interfaces for electrical power and temperature indicators, such as a thermocouple interface. The stem 226 may include a base assembly 238 adapted to detachably couple with the power box 203. A circumferential ring 235 is shown above the power box 203. In some embodiments, the circumferential ring 235 may be a shoulder adapted as a mechanical stop or land configured to provide a mechanical interface between the base assembly 238 and the upper surface of the power box 203.

A rod 230 may be included through a passage 224 formed in the bottom wall 216 of the processing region 220B and may be utilized to position substrate lift pins 261 disposed through the body of pedestal 228. The substrate lift pins 261 may selectively space the substrate 229 from the pedestal to facilitate exchange of the substrate 229 with a robot utilized for transferring the substrate 229 into and out of the processing region 220B through a substrate transfer port 260.

A chamber lid 204 may be coupled with a top portion of the chamber body 202. The lid 204 may accommodate one or more precursor distribution systems 208 coupled thereto. The precursor distribution system 208 may include a precursor inlet passage 240 which may deliver reactant and cleaning precursors through a gas delivery assembly 218 into the processing region 220B. The gas delivery assembly 218 may include a gasbox 248 having a blocker plate 244 disposed intermediate to a faceplate 246. A radio frequency ("RF") source 265 may be coupled with the gas delivery assembly 218, which may power the gas delivery assembly 218 to facilitate generating a plasma region between the faceplate 246 of the gas delivery assembly 218 and the pedestal 228, which may be the processing region of the chamber. In some embodiments, the RF source may be coupled with other portions of the chamber body 202, such as the pedestal 228, to facilitate plasma generation. A dielectric isolator 258 may be disposed between the lid 204 and the gas delivery assembly 218 to prevent conducting RF power to the lid 204. A shadow ring 206 may be disposed on the periphery of the pedestal 228 that engages the pedestal 228.

A faceplate 246 may be used to perform semiconductor processing operations including deposition of hardmask materials as previously described, as well as other deposition, removal, and cleaning operations. Faceplate 246 may be included in any number of processing chambers described above. Faceplate 246 may be included as part of the gas inlet assembly, such as with a gasbox and blocker plate. For example, a gasbox may define or provide access into a processing chamber. A substrate support may be included within the chamber and may be configured to support a substrate for processing. A blocker plate may be included in the chamber between the gasbox and the substrate support. The blocker plate may include or define a number of apertures through the plate. The components may include any of the features described previously for similar components, as well as a variety of other modifications similarly encompassed by the present technology.

Faceplate 246 may be positioned within the chamber between a blocker plate and a substrate support as illustrated previously. Nonetheless, faceplate 246 may be characterized by a first surface 243 and a second surface 245, which may be opposite the first surface. In some embodiments, first surface 243 may be facing towards a blocker plate, gasbox, or gas inlet into the processing chamber. Second surface 245 may be positioned to face a substrate support or substrate within a processing region of a processing chamber. Faceplate 246 may define a plurality of apertures (not shown) defined through the faceplate and extending from the first surface through the second surface. Each aperture may provide a fluid path through the faceplate, and the apertures may provide fluid access to the processing region of the chamber. Depending on the size of the faceplate, and the size of the apertures, faceplate 246 may define any number of apertures through the plate, such as greater than or about 1,000 apertures, greater than or about 2,000 apertures, greater than or about 3,000 apertures, greater than or about 4,000 apertures, greater than or about 5,000 apertures, greater than or about 6,000 apertures, or more. The apertures may have a uniform or staggered spacing and may be spaced apart at less than or about 10 mm from center to center. The apertures may also be spaced apart at less than or about 9 mm, less than or about 8 mm, less than or about 7 mm, less than or about 6 mm, less than or about 5 mm, less than or about 4 mm, less than or about 3 mm, or less.

In addition, an optional cooling channel 247 may be formed in the gasbox 248 of the gas distribution system 208 to cool the gasbox 248 during operation. A heat transfer fluid, such as water, ethylene glycol, a gas, or the like, may be circulated through the cooling channel 247 such that the gasbox 248 may be maintained at a predefined temperature. A liner assembly 227 may be disposed within the processing region 220B in close proximity to the sidewalls 201, 212 of the chamber body 202 to prevent exposure of the sidewalls 201, 212 to the processing environment within the processing region 220B. The liner assembly 227 may include a circumferential pumping cavity 225, which may be coupled to a pumping system 264 configured to exhaust gases and byproducts from the processing region 220B and control the pressure within the processing region 220B. A plurality of exhaust ports 231 may be formed on the liner assembly 227. The exhaust ports 231 may be configured to allow the flow of gases from the processing region 220B to the circumferential pumping cavity 225 in a manner that promotes processing within the system 200.

Figure 3:
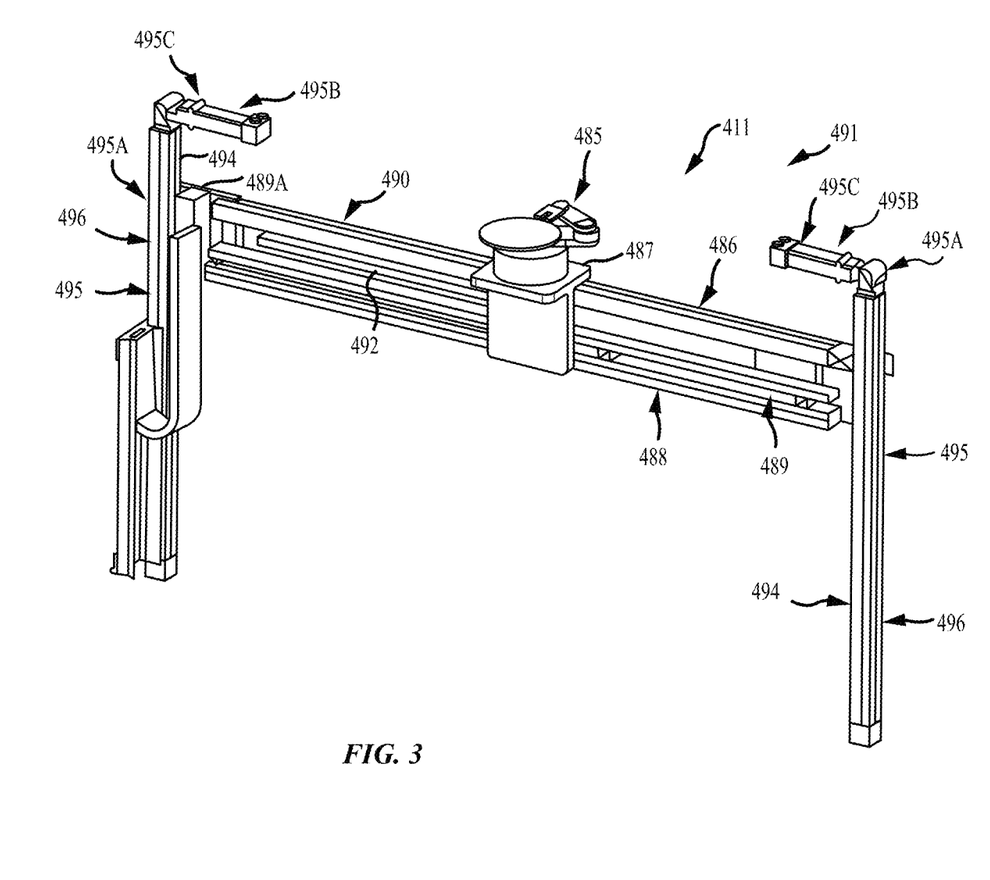
FIG. 3 shows an isometric view of a mounted articulating arm according to embodiments of the present technology.

Referring to FIG. 3, in embodiments, an articulating arm 485, which will be discussed in greater detail below, may be connected to a frame 490. The frame 490 may contain an actuator 489, a mounting bracket 487, a linear slide 488 and cable guide assembly 492. The linear slide 488 may contain one or more linear ball bearing slides, or a conventional linear guide, that guides the mounting bracket 487 and articulating arm 485. FIG. 3 illustrates embodiments of the present technology where a horizontal motion assembly 490 may contain a motor 489A (e.g., DC servo motor, stepper motor, etc.), a belt (not shown) and pulley system (not shown) which runs horizontally along the length of the horizontal motion assembly 490, are adapted to transfer and position the mounting bracket 487 so that the mounting bracket 487 and articulating arm 485 may be moved horizontally along the frame 490. In embodiments, frame 490 may be mounted to a semiconductor processing chamber support frame, or may be mounted to a movable conveyance, such as a cart. Moreover, in embodiments, articulating arm 485 may be disposed on a vertically extending portion of mounting bracket 487, depending upon the desired orientation and number of articulations in articulating arm 485. Furthermore, while frame 490 is illustrated as having horizontal and vertical motion, it should be clear that the frame 490 and mounting bracket 487 may be stationary, in embodiments, and a movable conveyance may be utilized instead to position the articulating arm.

Nonetheless, FIG. 3 illustrates an isometric view of embodiments of an articulating arm assembly 411. The vertical motion assembly 495 may generally contain a lift rail assembly 495A, a lift actuator 495B, and a vertical enclosure 495D. The lift rail assembly 495A may contain a structural support 496 and a guide mechanism 494 to precisely raise and lower the horizontal motion assembly 490. The structural support 496 is a conventional structural member, such as an I-beam or other common structural component, that is designed to connect the articulating arm assembly 411 to a frame (such as a processing chamber frame or conveyance frame discussed above) and support the weight and loads created by the vertical motion assembly 495 and the horizontal motion assembly 490 components. The guide mechanism 494 may be a linear ball bearing slide or a conventional linear guide that is able to align and precisely guide the horizontal motion assembly 490 as it moves vertically along the guide mechanism 494.

In embodiments, the lift actuator 495B contains a motor 495C (e.g., DC servomotor, stepper motor, or other type of actuator) that is used in conjunction with a belt and pulley configuration (not shown) to raise and lower the horizontal motion assembly 490 and its components. In embodiments, each vertical motion assembly contains a lift actuator 495B to raise and lower the horizontal motion assembly 490 and other supporting components. In other embodiments, a single lift actuator 495B mounted to one of the two vertical motion assemblies 495 and the other vertical motion assembly 495 contains the guiding mechanism 494.

Figures 4A, 4B:
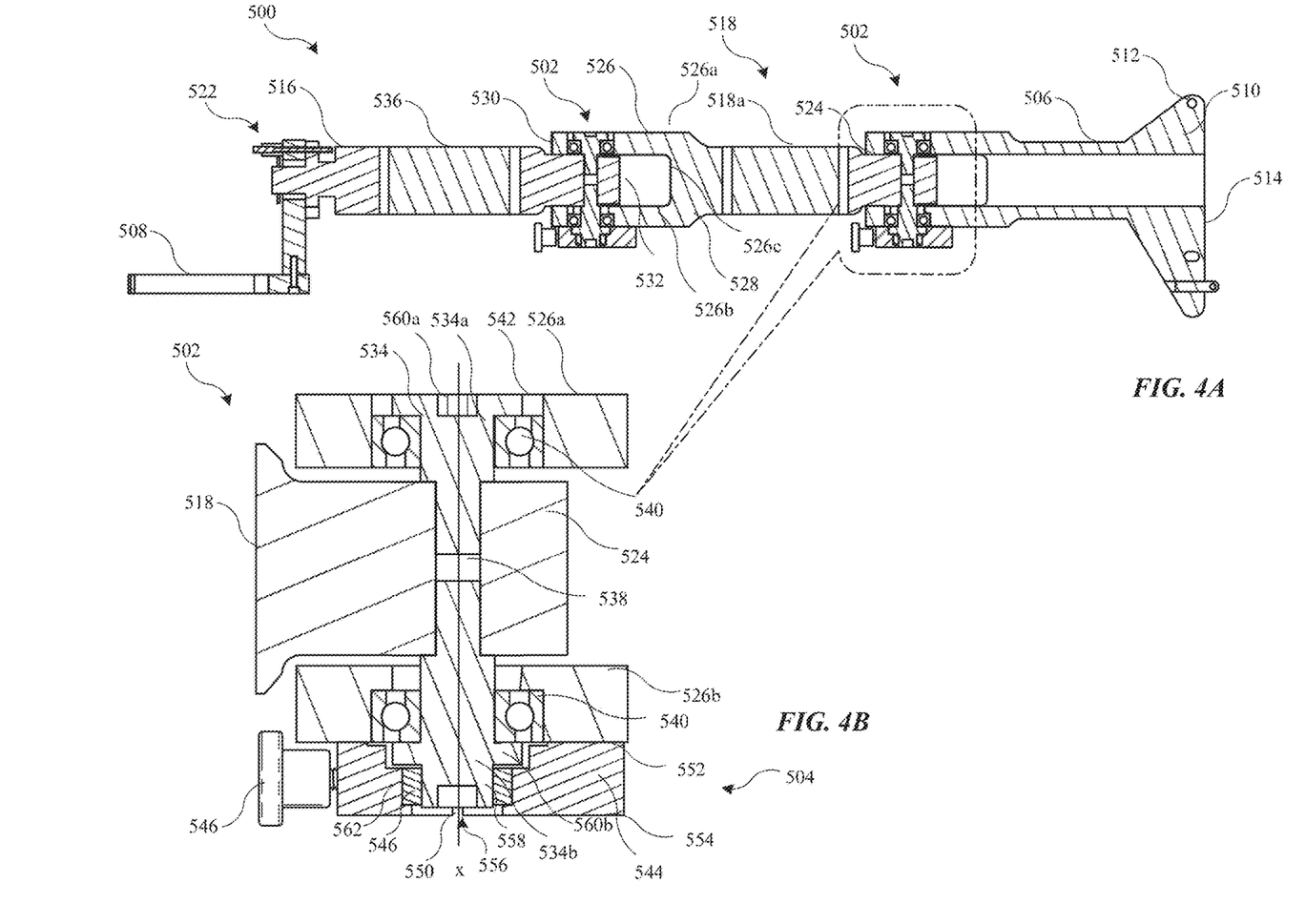

FIG. 4A illustrates a side view of an articulating arm 500, having one or more articulating linkages 502, according to embodiments of the present technology. In embodiments, the articulating arm may be a robotic articulating arm. In FIG. 4A, the articulating arm 500 may be illustrated in an extended position, such as a fully extended position, in embodiments. Whereas, in FIG. 3, the articulating arm 485 may be illustrated in a compressed position, such as a fully compressed position. The illustrated articulating arm is shown having two articulating linkages 502. However, it should be clear that the articulating arm may have one linkage, two linkages, three linkages, four linkages, five linkages, or more, depending upon the location of the semiconductor processing chamber, and assembly or disassembly needed. In embodiments, each articulating linkage may contain a friction brake 504, discussed in greater detail below, or only a portion of the articulating linkages 502 may contain a friction brake 504 discussed herein, where the other articulating linkages may contain a traditional brake, such as bearings, or bushings, and the like.

As illustrated, in embodiments, a first segment 506 of articulating arm 500 may be distal from component support 508. In embodiments, first segment 506 may form a first end 514 of the articulating arm 500, and may include or be fixedly or removably attached to a baseplate 510. In embodiments, baseplate 510 may contain one or more attachment locations 512 for fixedly or removably attaching baseplate to a support frame, such as one or more of the support frames discussed above. Nonetheless, the first end 514 may be opposed to a second end 516, along the length of articulating arm 500. In the extended position, the second end 516 may be spaced apart from the first end 514. However, in a compressed position, the first end 514 and second end 516 may be adjacent to one another. Nonetheless, in embodiments, the second end 516 may be fixedly or removably attached to component support 508. Thus, in an extended position, the component support 508 may also be spaced apart from first end 514 and baseplate 510.

In embodiments, the component support 508 may have any shape or depth, such as one or more quadrilaterals, including square and rectangular, circular, oval, triangular, and other shapes as known in the art. In embodiments, the component support 508 may have a shape that does not correspond to a shape of the component to be transported. For instance, if the component is circular, the component support may be a quadrilateral, such as square or rectangular. However, in embodiments, the component support may have the same shape or a similar shape to the component to be transported. Regardless of the shape of the component or the component support, in embodiments, the component support may have a lateral dimension, such as a width, that is less than a width or equivalent diameter of the component to be transferred, such as a width that is greater than or about 5% less than a width or equivalent diameter of the component, such as greater than or about 10%, greater than or about 15%, greater than or about 20%, greater than or about 25%, greater than or about 30%, up to about 60%, such as less than or about 50%, less than or about 45%, less than or about 40%, or any ranges or values therebetween.

Notwithstanding the size and shape of the component support 508, in embodiments, the component support 508, as well as arm segments 518, and/or movement pins 520, as well as other components of articulating arm 500, may be individually formed from a material with suitable strength characteristics, such as a metal or an alloy thereof. The metal or alloy thereof may have a density of about 3,000 kg/m3 or greater, such as about 3,500 kg/m3 or greater, such as about 4,000 kg/m3 or greater, such as about 4,500 kg/m3 or greater, such as about 5,000 kg/m3 or greater, such as about 5,500 kg/m3 or greater, such as about 6,000 kg/m3 or greater, such as about 6,500 kg/m3 or greater, such as about 7,000 kg/m3 or greater, such as about 7,500 kg/m3 or greater, or any ranges or values therebetween. Additionally or alternatively, the metal or alloy thereof may have a tensile strength of about 250 MPa or greater, such as about 300 MPa or greater, such as about 350 MPa or greater, such as about 400 MPa or greater, such as about 450 MPa or greater, such as about 500 MPa or greater, such as about 550 MPa or greater, such as about 575 MPa or greater, such as about 600 MPa or greater, or any ranges or values therebetween. The selected metal may be in any form, such as plates, bars, rods, or other forms suitable in the art. In some embodiments, component support 508, as well as arm segments 518, and/or movement pins 520, as well as other components of articulating arm 500, may be formed from stainless steel, aluminum, or combinations thereof. Namely, in embodiments, all or some of articulating arm 500 may be formed from a clean room compatible material. In such a manner, the articulating arm 500 may be utilized in and around semiconductor processing chambers, without contributing materials that may hinder substrate processing.

In embodiments, the component support 508 may be releasably attached to second end 516 via a releasable securement 522. Thus, while the component support 508 is illustrated as a plate or support, it should be clear that component support 508 may include other end effectors as known in the art, including grippers, clamps, vacuums, and the like, as well as combinations thereof. In embodiments, the releasable securement may be a clamp, a screw and thread, a locking pin, and the like, as well as combinations thereof. Therefore, in embodiments, component support 508 may be interchangeable so as to be utilized with multiple types and sizes of components and assembly/disassembly operations.

In embodiments, each arm segment 518 may have a first end 524 and a second end 526. Moreover, in embodiments, at least a portion of the segments may have a first end 524 and/or a second end 526 that is received by a corresponding first end 524 or second end 526 of an adjacent arm segment 518. In embodiments, at least a portion of the arm segments 518 may be interior arm segments 518, and may therefore not form a first end 514 and/or a second end 516 of the articulating arm 500 (and may therefore not contain a direct connection to base plate 514 or component support 508, e.g. directly connect to the base plate 514 or component support 508). In the illustrated embodiments, the first end 524 is shown as being a male connection, whereas second end 526 is shown as being a female connection. However, it should be clear that other connections are contemplated herein, such as wherein the first and send end connections are reversed, or where both the first end and second end are plates, having the same or similar shape.

Nonetheless, in embodiments, a first end 524 of an arm segment 518 may be received within a second end 526 of an adjacent arm segment 518. In embodiments, second end 526 may have a pronged or female shape, having an upper arm 526a and a lower arm 526b. The gap distance between the upper arm 526a and lower arm 526b may correspond to a width of first end 524. For instance, in embodiments, the arm segment 518 may have a taper 528, facilitating an increase in width or diameter of arm segment 518 moving from arm segment body 518a towards second end 526. In such a manner, an outer diameter or width of second end 526 may be greater than a diameter or width of body portion 518a, such as more than or about 5% greater than a diameter or width of body portion 518a, such as greater than or about 6%, greater than or about 7%, greater than or about 8%, greater than or about 9%, greater than or about 10%, greater than or about 11%, greater than or about 12%, greater than or about 13%, greater than or about 14%, greater than or about 15%, up to about 50% or less, such as less than or about 40%, less than or about 30%, less than or about 25% or any ranges or values therebetween.

Moreover, an inner diameter or width of second end 526 (e.g. the distance between an interior edge of upper arm 526a and interior edge of lower arm 526b) may be less than a diameter or width of body portion 518a, or may be generally equivalent to a diameter or width of body portion 518a. In embodiments, the inner diameter or width of second end 526 may be greater than or about 1% less than a width of body portion 518a, such as greater than or about 2%, greater than or about 3%, greater than or about 4%, greater than or about 5%, greater than or about 6%, greater than or about 7%, greater than or about 8%, greater than or about 9%, greater than or about 10% less, or any ranges or values therebetween. Nonetheless, as discussed above, in embodiments, the inner diameter or width of second end 526 may be generally the same as a diameter or width of body portion 518a.

In embodiments, the inner diameter or width of second end 526 may be greater than a diameter or width of first end 524. Namely, in embodiments, the arm segment 518 may have a taper 530, facilitating a decrease in width or diameter of arm segment 518 moving from arm segment body 518a towards first end 524. In such a manner, an outer diameter or width of first end 524 may be less than a diameter or width of body portion 518a, such as greater than or about 1% less than a diameter or width of body portion 518a, such as greater than or about 2%, greater than or about 3%, greater than or about 4%, greater than or about 5%, greater than or about 6%, greater than or about 7%, greater than or about 8%, greater than or about 9%, greater than or about 10%, greater than or about 15%, up to about 50% or less, such as less than or about 40%, less than or about 30%, less than or about 25% of a diameter of body portion 518a, or any ranges or values therebetween.

Thus, in embodiments, the first end 524 may be retained in an inner volume 532 at least partially defined by the upper arm 526a, lower arm 526b, and interior wall 526c, of second end 526. For instance, in embodiments, all or a portion of the first end 524 beyond taper 530 from body portion 518a may be disposed within volume 532. In such a manner, shaft 534 may extend through upper arm 526a, first end 524, and lower arm 526b, such as one or more apertures therethrough, rotatably connecting adjacent arm segments 518 such that adjacent arm segments 518 may be articulated.

Nevertheless, as discussed above, in embodiments, some or all of the arm segments 518 may have a first end 524 and second end 526 as discussed herein. For instance, in embodiments, interior segments may include the configuration discussed above. However, as previously stated, in embodiments, the articulating arm 500 may also contain a first end 514 and a second end 516, formed from end arm segments 506, 536 (which may also be referred to as first arm segment 506, and last arm segment 536). While only one interior arm segment 518 is illustrated, it should be understood that the articulating arm may have more interior arm segments 518 based upon the desired length of articulating arm 500 (e.g. the distance needed or desired for conveyance). In embodiments, first arm segment 506 may have a first end 524 attached or forming baseplate 510, as discussed above, and a second end that contains any one or more of the male or female second ends 526 discussed above. In such a manner, the second end 526 of first arm segment 506 may be well suited for receiving a first end 524 of an interior arm segment, or other arm segment 518. Furthermore, last arm segment 536 may have a second end fixedly or releasably attached to component support 508 as discussed above, and a first end that contains any one or more of the male or female first ends 524 discussed above. In such a manner, the first end 524 of last arm segment 536 may be well suited for receiving a second end 526 of an interior arm segment, or other arm segment 518.

Regardless of the number of arm segments 518, each arm segment is connected to one or more adjacent arm segments 518 via articulating linkage 502, which may be shown more clearly in FIG. 4B. Namely, as illustrated, FIG. 4B may show an expanded view of an articulating linkage, such as an articulating linkage 502. As illustrated, the articulating linkage may contain a shaft 534. The shaft 534 may extend through and be rotatably connected with upper arm 526a, first end 524, and lower arm 526b. In embodiments, each or some of the upper arm 526a, lower arm 526b, and first end 524 may contain an aperture 542 extending therethrough that corresponds with the desired location of shaft 534. However as discussed above, in embodiments, the shaft may be formed integrally with one or more of the upper arm 526a, lower arm 526b, and first end 524. In addition, shaft 534 may be connected to an actuator 538, which may initiate movement of the respective arm segment. The actuator may be a linear actuator, or other actuator known in the art of articulating arms, suitable for rotating shaft 534, and moving the arm segments 518 linked by shaft 534 around an axis "x" formed by shaft 534. As illustrated, in embodiments, the shaft 534 may be fixedly attached to first end 524, such as by being welded, clamped, threaded, or integrally formed with the shaft. In embodiments, the shaft 534 may be attached to first end 524 at an approximate midpoint of the shaft 534, such as by having complementary threads or a permanent or releasable attachment. However, other orientations are contemplated herein.

Furthermore, in embodiments, a first end 534a and a second end 534b of shaft 534 may be movably attached to upper arm 526a and lower arm 526b. In embodiments, the connection between the upper arm 526a and first end 534a, and/or lower arm 526b and second end 534b may including one or more guide assemblies 540. For instance, in embodiments, the shaft may be connected to second end 526 utilizing one or more guide assemblies 540, which may include ball bearings, slides, supports, ball screws, and the like. The upper arm 526a and/or second arm 526b may be releasably or fixedly attached to the guide assemblies 540, such as in one or more press-fit orientations. Nonetheless, the one or more guide assemblies 540 may allow for adjacent arm segments 518 to move relative to one another around shaft 534, such as when acted upon by actuator 538.

Regardless of the orientation of the articulating linkage 502, at least a portion of the articulating linkages 502 may contain a friction brake 504. In embodiments, each articulating linkage 502 may contain a friction brake 504. In embodiments, friction brake 504 may contain a tension block 544, a braking support 546, and a tension screw 548. As will be discussed in greater detail, in embodiments, the friction brake 504 may also contain a tension gap 550. In embodiments, the tension gap may extend in a direction generally perpendicular to a central axis of tension screw 548.

In embodiments, the tension block may have a front side 552 in contact with an outer surface of lower arm 526b, and a backside 554 opposite front side 552. The front side 552 may be permanently or releasably affixed to lower arm 526b. For instance, as illustrated more clearly in FIG. 5, the tension block 544 may be affixed via an attachment 572 to lower arm 526b using one or more screws, pins, welds, or the like, as well as combinations thereof. Regardless of the attachment utilized, the front side 552 may be held in contact with lower arm 526b.

In embodiments, the tension block 544 defines an aperture 556 extending through tension block 544, from the front side 552 to the backside 554. In embodiments, the aperture 556 may be generally centrally located, and disposed around an approximate center point of the tension block 544. In embodiments, the aperture 556 may be sized and shaped to accommodate a second end 534b of shaft 534. Namely, in embodiments, while first end 534a, including flange 560a and guide assembly 540, of shaft 534 may be fully contained within upper arm 526a, second end 534b may include a projection 558. The projection 558 may extend past the shaft flange 560b and guide assembly 540, outwardly away from a second end 534b of the shaft. In such a manner, the projection 558 and/or flange 560b may be disposed beyond the lower arm 526b (e.g. outward of an outer surface of lower arm 526b). Instead, the projection 558 and/or flange 560b of the second end 534b may be contained within the aperture 556 of tension block 544. Thus, in embodiments, the tension block 544 may be utilized, when activated, to shift the hinge point or tension point of shaft 534 towards backside 554 of tension block 544, past an outer surface of lower arm 526b. Such a shift allows for a highly tailored tension and force to be applied to shaft 534, allowing for improved control over sway and transfer, even under heavy load.

In embodiments, a braking support 546 may be disposed between projection 558 of shaft 534 and an inner sidewall 562 of aperture 556. In embodiments, braking support 546 may be formed from a material that increases friction between tension block 544 and projection 558. Additionally or alternatively, braking support 546 may be utilized to prevent metal-on-metal contact between the tension block 544 and projection 558 of shaft 534. Nonetheless, in embodiments, the braking support 546 may also be formed from a clean room compatible material, such as a polyamide, a synthetic fluoropolymer, and the like, as well as combinations thereof. For instance, in embodiments, the braking support 546 may be formed from polytetrafluoroethylene, a nylon, or a combination thereof.

Figure 5:
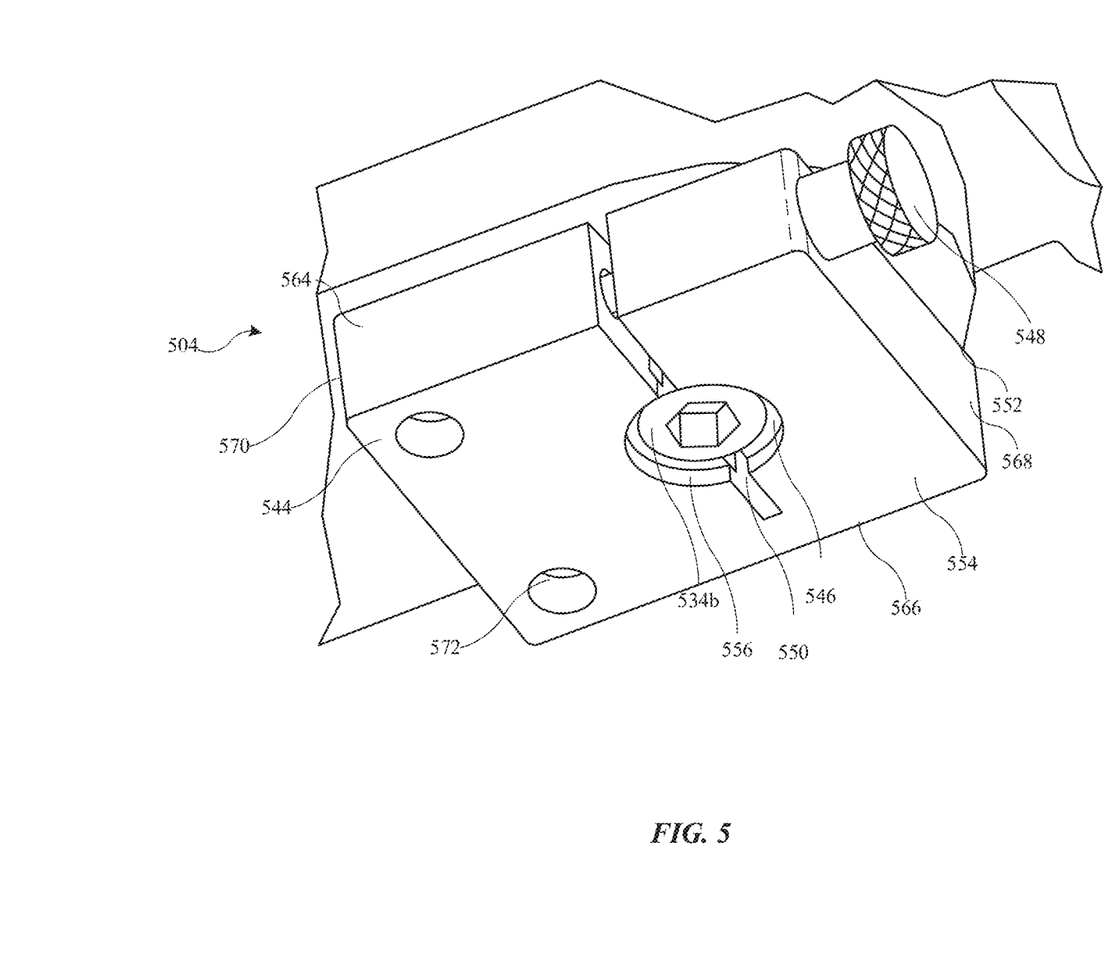
FIG. 5 shows a bottom perspective view of a friction brake according to embodiments of the present technology.

Referring next to FIG. 5, a bottom view of friction brake 504 is provided. As illustrated, the friction brake 504 includes a tension gap 550. In embodiments, the tension gap bisects aperture 556 and extends through a first sidewall 564 of tension block 544. In embodiments, the tension gap 550 may terminate at the central aperture 556. However, in embodiments, the tension gap 550 may extend through aperture 556, towards a second sidewall 566, opposed to first sidewall 564. Nonetheless, in embodiments, the tension gap 550 may not extend through second sidewall 566, and instead may terminate at a location between aperture 556 and second sidewall 566. In such a manner, the tension gap 550 may provide for a reduction in a diameter of aperture 556, across all or a portion of the aperture 556, increasing the tension provided to shaft 534 in a generally uniform manner. In embodiments where decreased tension is desired, it may be possible to terminate the tension gap 550 at or near the aperture 556. However, in embodiments, by extending the tension gap through the aperture 556 towards a second sidewall 566, increased control over the tension, and more uniform tension across the aperture 556.

In embodiments, tension screw 548 may extend in a plane generally perpendicular to the direction of extension of gap 550. For instance, in embodiments, tension screw 548 may extend through an aperture that extends through a third sidewall 568 towards a fourth sidewall 570 opposed to third sidewall 568, where the third sidewall 568 and/or fourth sidewall 570 extend generally perpendicular to first sidewall 564 and/or second sidewall 566. As illustrated, in embodiments, to provide adequate tension and leverage on the tension gap 550, the tension screw 548 may be disposed adjacent to first sidewall 564 (e.g. the sidewall in which gap 550 extends fully therethrough). For instance, in embodiments, the tension screw 548 may extend through the tension block 544 at a location between aperture 556 and first sidewall 564. In embodiments, the tension screw 548 may extend directly along first sidewall 564 on an interior of tension block 544, such as directly adjacent to first sidewall 564. With such an orientation, when tension on tension screw 548 is increased, the tension gap 550 may be reduced in width, applying increased tension to aperture 556, braking support 546, and shaft 534, allowing for careful control of the tension applied to the shaft 534 during movement and braking.

Figure 6:
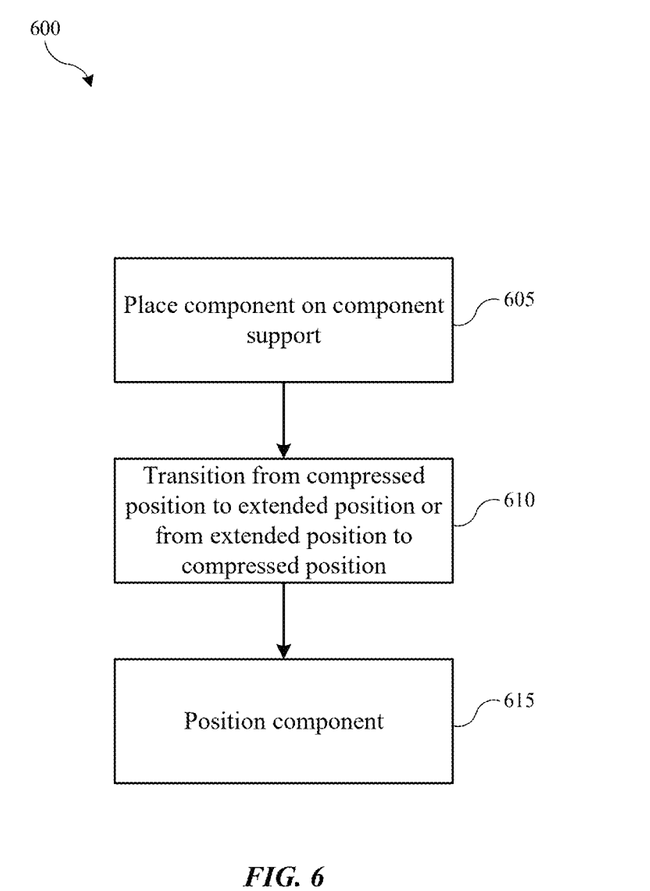
FIG. 6 shows operations of an exemplary method of semiconductor processing according to some embodiments of the present technology.

FIG. 6 shows operations of a method of assembling a semiconductor processing chamber, such as any one or more of processing chambers 108(208) discussed above. For instance, the method 600 may include placing a component of a processing chamber onto a component support of an articulating arm, at operation 605 where the component support may be according to any one or more of the embodiments discussed herein. In addition, the component of a processing chamber may be any one or more aspects of a gas delivery assembly, a lid assembly, or the like. In some embodiments, the component may have a weight of about 1 kilogram (kg) or more, such as about 5 kg or more, such as about 10 kg or more, such as about 20 kg or more, such as about 30 kg or more, such as about 40 kg or more, such as about 50 kg or more, such as about 60 kg or more, such as 70 kg or more, such as 80 kg or more, such as 90 kg or more, such as 100 kg or more, such as 110 kg or more, such as 120 kg or more, such as 130 kg or more, such as 140 kg or more such as up to 150 kg or more, or any ranges or values therebetween. Regardless of the component selected, it should be clear that step 605 occurs when the component assembly platform is in a compressed position or an extended position.

After the component has been placed on the component support, the articulating arm is transitioned from the compressed position to an extended position or from an extended position to a compressed position, at operation 610. It should be acknowledged that, in some embodiments, the transition may be automatic. Particularly, the extended position may be selected based upon the respective processing chamber to automatically provide a component at the desired location. Furthermore, it should be understood that, if the component is being disassembled, the component may be loaded in the extended position, and retracted to the compressed position after retrieval of the component. Regardless, due to the friction brakes discussed herein, the articulating arm may exhibit excellent stability with minimal to no sway. Namely, in embodiments, based upon the initial load, the tension screw may be tightened or loosened to provide proper control of the articulating arm. In embodiments, the manipulation of the tension screw may be automatic or manual.

Additionally or alternatively, in embodiments, sensors, such as one or more optical sensors may be utilized to signal to the articulating arm that the fully extended position has been reached, such as when the component support is aligned with an installment or disassembly location, stopping motion of the assembly and/or to adjust tension of the tension screw. Namely, in embodiments, one or more cameras and one or more optical sensors may be utilized to align the articulating arm with an opening or portion of a process chamber. In embodiments, the optical sensors may be utilized to align the articulating arm in a horizontal plane with the sidewalls of the opening, in a vertical plane, with a bottom and top wall of the opening, and/or a depth distance in a horizontal plane. For instance, optical sensors may be utilized to determine how closely in a horizontal plane the component support should be placed in order to dispose component support at an appropriate location within the processing chamber. Additionally or alternatively, the optical sensor may be utilized to set the extension distance if a fully extended position is not necessary. In embodiments, one or more cameras may be utilized either alone, or in addition to one or more optical sensors, to aid in the alignment of the articulating arm in any of the manners discussed in regards to optical sensors. In embodiments, the alignment, distance selection, and transitioning, such as operations 601, 605, and 610, for example, may be automatically conducted, such as utilizing one or more processors configured to execute the operations. However, in embodiments, a user may manually set an initial compressed and extended position, and the sensors and/or computer may utilize the initial position to repeat the positions for subsequent processing and handling.

Once the articulating arm is in the fully extended position, the component may be assembled, disassembled, or positioned, at the desired location within or on the processing chamber. As discussed herein, the transition to the extended position transports the component to a location directly above or below the desired assembly position. Thus, a user or automatic assembly mechanism may merely need to position the component a short distance from the component support, reducing, or even eliminating, the difficulties in assembling large and/or heavy components into processing chambers.

Figure 7:
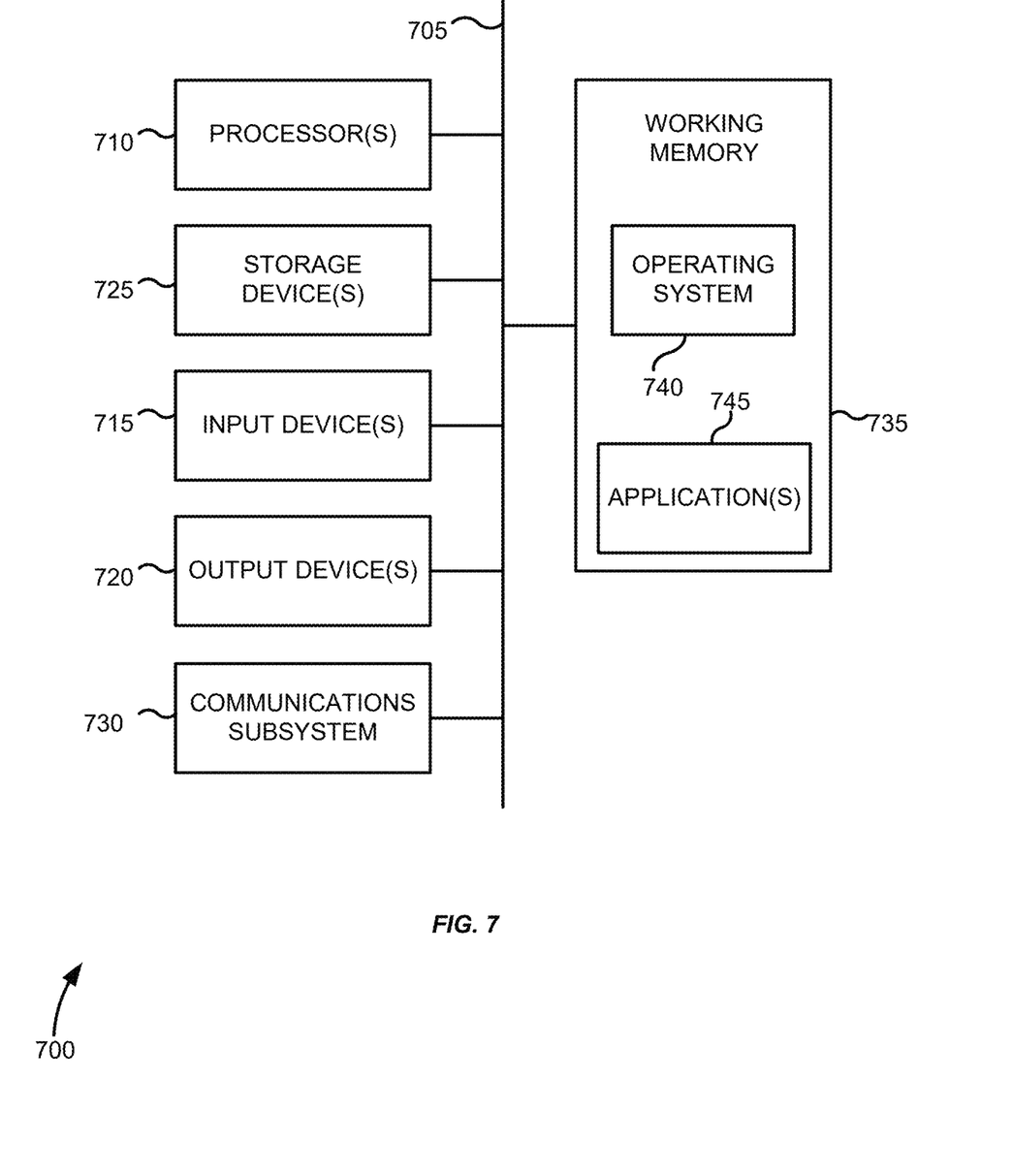
FIG. 7 illustrates a block diagram of a sample computer system that may operate embodiments of the present technology.

Nonetheless, as illustrated in FIG. 7, in embodiments, the systems and methods may be executed fully or in part by a processor which may be incorporated as part of the previously described computer system 301. For example, computer system 700 can represent some of the components of a controller or computer system described herein. FIG. 7 provides a schematic illustration of one embodiment of a computer system 700 that can perform the methods provided by various other embodiments, as described herein. FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown including hardware elements that can be electrically coupled via a bus 705 (or may otherwise be in communication, as appropriate), which may also be connected with controller 301. The hardware elements may include a processing unit 710, including without limitation one or more processors, such as one or more central processing units (CPUs), graphical processing units (GPUs), special-purpose processors (such as digital signal processing chips, graphics acceleration processors, and/or the like); one or more input devices 715, which can include without limitation a keyboard, a touchscreen, receiver, a motion sensor, a camera, a smartcard reader, a contactless media reader, and/or the like; and one or more output devices 720, which can include without limitation a display device, a speaker, a printer, a writing module, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communication interface 730, which can include without limitation a modem, a network card (wireless or wired), an infrared communication device, a wireless communication device and/or chipset (such as a Bluetooth device, an 502.11 device, a Wi-Fi device, a WiMAX device, an NFC device, cellular communication facilities, etc.), and/or similar communication interfaces. The communication interface 730 may permit data to be exchanged with a network (such as the network described below, to name one example), other processors, and/or any other devices described herein. In many embodiments, the computer system 700 will further comprise a non-transitory working memory 735, which can include a RAM or ROM device, as described above.

The computer system 700 also can also include software elements, shown as being currently located within the working memory 735, including an operating system 740, device drivers, executable libraries, and/or other code, such as one or more application programs 745, which may include processor programs provided by various embodiments, and/or may be designed to implement methods, and/or configure systems, provided by other embodiments, as described herein. Merely by way of example, one or more procedures described with respect to the method(s) or systems discussed above might be implemented as code and/or instructions executable by a computer (and/or a processor within a computer); in an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 710, applications 745, etc.) Further, connection to other computing devices such as network input/output devices may be employed.

Some embodiments may employ a computer system (such as the computer system 700) to perform methods in accordance with the disclosure. For example, some or all of the procedures of the described methods may be performed by the computer system 700 in response to processing unit 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the storage device(s) 725. Merely by way of example, execution of the sequences of instructions contained in the working memory 735 might cause the processing unit 710 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processing unit 710 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 725. Volatile media include, without limitation, dynamic memory, such as the working memory 735. Transmission media include, without limitation, coaxial cables, copper wire, and fiber optics, including the wires that comprise the bus 705, as well as the various components of the communication interface 730 (and/or the media by which the communication interface 730 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 730 (and/or components thereof) generally will receive the signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processing unit 710 and controller 301.

In the embodiments described above, for the purposes of illustration, processes may have been described in a particular order. It should be appreciated that in alternate embodiments, the methods may be performed in a different order than that described. It should also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods. These machine-readable instructions may be stored on one or more machine-readable mediums, such as CD-ROMs or other type of optical disks, floppy disks, ROMs, RAMs, EPROMs, EEPROMs, magnetic or optical cards, flash memory, or other types of machine-readable mediums suitable for storing electronic instructions. Alternatively, the methods may be performed by a combination of hardware and software.

The methods, systems, devices, graphs, and tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included.

As used herein and in the appended claims, the singular forms "a", "an", and "the" include plural references unless the context clearly dictates otherwise. Thus, for example, reference to "a heater" includes a plurality of such heaters, and reference to "the protrusion" includes reference to one or more protrusions and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

The invention claimed is:

1. An articulating arm, comprising:
 a first articulating arm segment;
 a second articulating arm segment; and
 an articulating linkage movably connecting the first articulating arm segment and the second articulating arm segment, the articulating linkage comprising:
  a shaft having a first end and a second end, the shaft extending through the first articulating arm segment and the second articulating arm segment, and
  a friction brake comprising a tension block and a tension screw,
  wherein the second end of the shaft is disposed in an aperture extending through the tension block, and wherein the tension screw extends through the tension block in a direction perpendicular to the aperture.

2. The articulating arm of claim 1, further comprising a braking support disposed between an inner wall of the aperture and an exterior surface of the second end of the shaft.

3. The articulating arm of claim 1, wherein the second end of the shaft comprises a flange and a projection, wherein the flange and the projection are disposed within the aperture of the tension block.

4. The articulating arm of claim 1, wherein the tension block further comprises a tension gap extending through a width of the tension block through a first sidewall toward an opposed second sidewall.

5. The articulating arm of claim 4, wherein the tension gap bisects the aperture.

6. The articulating arm of claim 4, wherein the tension gap extends in a direction perpendicular to the tension screw.

7. The articulating arm of claim 4, wherein the tension screw is disposed adjacent to the first side.

8. The articulating arm of claim 4, wherein the tension gap extends through the first sidewall to a point between the aperture and the second sidewall.

9. The articulating arm of claim 1, wherein the first articulating arm segment comprises a first end comprising a base, and a second end, and the second articulating arm segment comprises a first end and a second end, wherein the first end of the second articulating arm segment is disposed in the second end of the first articulating arm segment.

10. The articulating arm of claim 9, wherein the second end of the first articulating arm segment comprises an upper arm and a lower arm, at least partially defining a volume therebetween, wherein a distance between an interior edge of the upper arm and an interior edge of the lower arm is greater than a width of the first end of the second articulating arm segment.

11. The articulating arm of claim 10, wherein the shaft extends through the upper arm, the first end, and the lower arm, and wherein the second end of the shaft extends past an exterior surface of the lower arm.

12. An articulating arm, comprising:
 a first articulating arm segment comprising a second end and a first end comprising a base;
 a second articulating arm segment comprising a first end and a second end;
 a third articulating arm segment comprising a first end and a second end comprising a component support; and
 a first articulating linkage movably connecting the first articulating arm segment and the second articulating arm segment and a second articulating linkage movably connecting the second articulating arm segment and the third articulating arm segment, each articulating linkage comprising:
  a shaft having a first end and a second end, the shaft extending through the first articulating arm segment and the second articulating arm segment, and
  a friction brake comprising a tension block and a tension screw,
  wherein the second end of the shaft is disposed in an aperture extending through the tension block, and wherein the tension screw extends through the tension block in a direction perpendicular to the aperture.

13. The articulating arm of claim 12, further comprising a braking support disposed between an inner wall of the aperture and an exterior surface of the second end of the shaft.

14. The articulating arm of claim 12, wherein the second end of the shaft comprises a flange and a projection, wherein the flange and the projection are disposed within the aperture of the tension block.

15. The articulating arm of claim 12, wherein the tension block further comprises a tension gap extending through a width of the tension block through a first sidewall toward an opposed second sidewall.

16. The articulating arm of claim 15, wherein the tension gap bisects the aperture and/or wherein the tension gap extends in a direction perpendicular to the tension screw.

17. The articulating arm of claim 15, wherein the tension screw is disposed adjacent to the first side.

18. The articulating arm of claim 15, wherein the tension gap extends through the first sidewall to a point between the aperture and the second sidewall.

19. A method of assembling a semiconductor processing chamber component comprising:
 placing a processing chamber component on a component support of an articulating arm, comprising:
  a first articulating arm segment,
  a second articulating arm segment,
  an articulating linkage movably connecting the first articulating arm segment and the second articulating arm segment, the articulating linkage comprising:
   a shaft having a first end and a second end, the shaft extending through the first articulating arm segment and the second articulating arm segment, and
   a friction brake comprising a tension block and a tension screw,
   wherein the second end of the shaft is disposed in an aperture extending through the tension block, and wherein the tension screw extends through the tension block in a direction perpendicular to the aperture;
 transitioning the articulating arm from a compressed position to an extended position or from the extended position to the compressed position; and
 positioning the processing chamber component.

20. The method of claim 19, wherein the processing chamber component has a weight of about 75 kilograms or more.

* * * * *